(12) United States Patent
Hansen et al.

(10) Patent No.: US 6,214,214 B1
(45) Date of Patent: Apr. 10, 2001

(54) WATER TREATMENT SYSTEM WITH PURGE VALVE RESPONSIVE TO FLUID SIGNALS

(75) Inventors: Christopher L. Hansen, Newbury; Stuart Park, Burton; Peter Halemba, Russell, all of OH (US)

(73) Assignee: Kinetico Incorporated, Newbury, OH (US)

( * ) Notice: Subject to any disclaimer, the term of this patent is extended or adjusted under 35 U.S.C. 154(b) by 0 days.

(21) Appl. No.: 09/281,989

(22) Filed: Mar. 29, 1999

(51) Int. Cl.$^7$ ..................................................... B01D 24/26
(52) U.S. Cl. .......................... 210/106; 210/143; 210/142; 210/190; 210/269; 137/624.18
(58) Field of Search ................................... 210/87, 88, 98, 210/190, 141, 142, 143, 191, 269, 106, 85, 108, 275, 277, 279, 278, 333.01, 333.1, 334, 411, 264; 137/624.14, 624.18

(56) References Cited

U.S. PATENT DOCUMENTS

| | | |
|---|---|---|
| 3,891,552 | 6/1975 | Prior et al. . |
| 4,298,025 | 11/1981 | Prior et al. . |
| 4,427,549 | * 1/1984 | Brown et al. . |
| 4,693,814 | 9/1987 | Brown . |
| 4,764,280 | 8/1988 | Brown et al. . |
| 4,804,465 | 2/1989 | Brown . |
| 5,022,994 | 6/1991 | Avery et al. . |
| 5,069,779 | * 12/1991 | Brown et al. . |
| 5,310,488 | 5/1994 | Hansen et al. . |
| 5,476,584 | * 12/1995 | McDougald . |
| 5,490,932 | 2/1996 | Hansen et al. . |
| 5,674,403 | * 10/1997 | Kinney . |
| 5,950,244 | * 6/1999 | Stamos et al. . |

* cited by examiner

Primary Examiner—Joseph W. Drodge
Assistant Examiner—Terry K. Cecil
(74) Attorney, Agent, or Firm—Watts, Hoffman, Fisher & Heinke Co.

(57) ABSTRACT

A water treatment system including a pair of water treatment tanks, each tank defining a flow path extending from a tank inlet to a tank outlet and containing a water treatment material disposed along the flow path for treating water as it travels from the inlet to the outlet. A system controller controls which of the tanks is on-line and which of the tanks is off-line and controls the regeneration of an exhausted tank. The system controller is operative to provide a final rinse in the service direction. This is accomplished by a purge valve which communicates the outlet of a tank being regenerated to a drain under predetermined operating conditions. The operation of the purge valve is responsive to fluid signals applied to an inlet valve and an outlet valve associated with the tank being regenerated. More specifically, the fluid signals that close the outlet valve and open the inlet valve, are utilized to cause the opening of the purge valve in order to communicate the tank outlet with the drain. The invention obviates the need for separate fluid pressure signals for the purge valve. The system controller also includes an improved regeneration control turbine which includes a plurality of vanes extending from a hub and positioned between disc-like members that overlie the edges of the vanes in order to create cavities for receiving fluid emitted by a regeneration control nozzle. The improved turbine reduces water consumption of the system.

7 Claims, 6 Drawing Sheets

WATER TREATMENT SYSTEM WITH PURGE VALVE RESPONSIVE TO FLUID SIGNALS

TECHNICAL FIELD

The present invention relates generally to fluid treatment and in particular to an improved control system and control device for controlling a fluid treatment apparatus.

BACKGROUND ART

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank.

The quantity of water treated by a given tank, is monitored by a mechanism that includes a water usage turbine driven by water entering the on-line resin tank. When a predetermined quantity of water is treated, which produces to a predetermined number of revolutions in the turbine, a regeneration sequence is initiated which places the standby tank on-line and isolates the exhausted tank.

A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. With the disclosed arrangement, the frequency of regeneration of the water softener system is determined by the usage turbine which directly measures the quantity of fluid treated by a given tank.

In Pat. No. 4,427,549 which is also owned by the present assignee, a deionization method and apparatus is disclosed. The disclosed apparatus includes a control valve similar to the control valve disclosed in U.S. Pat. No. 4,298,025 in that it includes a usage turbine for monitoring the amount of source water treated by a given tank and a regeneration control turbine for driving a control element through a regeneration sequence.

In the control valves disclosed in the above-identified patents, the last step in the regeneration sequence is a water rinse that is performed in the counterflow direction. It is known that a fast rinse in the service direction or "downflow" rinse provides certain advantages over a rinse in the counterflow direction. For example, a downflow fast rinse tends to pack the media bed making the operation of the bed more effective upon initial start-up. Attempts have been made to provide a downflow fast rinse in the type of control valve disclosed in the above-identified patents, but these attempts have resulted in undue complexity in the valve, and the need for creating additional fluid signals in order to provide the necessary rinse function.

It has also been found desirable to improve the overall efficiency of the type of valve disclosed in the above-identified patents, so that the amount of water consumed during regeneration is reduced.

DISCLOSURE OF INVENTION

The present invention provides a new and improved control valve for controlling a fluid treatment apparatus such as a deionization system or a water softener. In the illustrated embodiment, the improved control valve is used to control a fluid treatment system having a pair of resin tanks, one of which is on-line, while the other is regenerated and held in a standby condition. The disclosed control valve, although similar to the control valves described in U.S. Pat. Nos. 4,298,025 and 4,427,549, which are hereby incorporated by reference, includes several improvements which enhance the overall operation of a fluid treatment system that utilizes the control valve.

According to the invention, a water treatment apparatus is disclosed including at least one treatment tank containing a treatment material The tank defines a fluid flow path through which water to be treated is passed. The treatment tank may form part of a water softener, deionization unit or a mechanical filter. A control unit similar in construction to the control valve illustrated in U.S. Pat. Nos. 3,891,552 and 4,298,025 controls the communication of water to be treated (or a water source) with a tank inlet and controls the communication of treated water from a tank outlet and a conduit or system outlet. In the illustrated embodiment, the control unit also has a regeneration controller that controls the regeneration of the tank when needed.

In accordance with the invention, a downflow rinse is provided during regeneration which communicates rinse water to the tank and passes it through the tank in a service direction and discharges the rinse water to an ambient drain. To achieve this feature, the control unit includes a purge valve for communicating the outlet of the tank with an ambient drain. According to the invention, the purge valve communicates the outlet of the tank with an ambient drain when an outlet valve associated with the tank is closed and an associated inlet valve is closed. The inlet valve controls the communication of the source water with the inlet of the tank. In the illustrated embodiment, the purge valve does not require a separate signal from the regeneration controller to effect the required communication of the tank outlet with the ambient drain. It utilizes existing signals that are used to close the associated outlet valve and open the associated inlet valve.

In accordance with a more preferred embodiment of the invention, the apparatus includes a second tank and the control unit is operative to control which of the tanks is on-line and which of the tanks is regenerated and then kept off-line until the on-line tank requires regeneration. Both tanks in this more preferred embodiment, however, are rinsed in the service direction by the regeneration controller, during a regeneration cycle. In the more preferred embodiment, the controller includes separate purge valves for each tank, each of the purge valves being controlled by a combination of signals sent to the corresponding tank inlet and tank outlet valves. In the preferred and illustrated embodiment, the signals comprise fluid signals which apply pressures to valve operating pistons forming part of the respective tank inlet and outlet valves.

According to another feature of the invention, the regeneration controller includes a regeneration turbine which is driven by fluid emitted from a regeneration control nozzle. The disclosed turbine is an improvement of the regeneration control turbine shown and discussed in the above-identified patents. The improved turbine includes a plurality of vanes extending from a hub. Side edges of the turbine blades are captured between a pair of disc-like structures so that a plurality of enclosed cavities are provided. These enclosed cavities receive fluid emitted by the regeneration control nozzle, which in turn applies forces to the turbine causing its rotation. Because the cavities are enclosed, the fluid emitted by the nozzle can only escape through the openings through which the fluid entered. In the past, turbine blades of the regeneration control turbine extended openly and were not confined. The disclosed turbine construction substantially improves the efficiency of the regeneration control mechanism thereby reducing the amount of driving fluid needed to sequence the controller through a regeneration cycle.

A fuller understanding will be obtained and additional features of the invention will become apparent in reading the following detailed description made in connection with the accompanying drawings.

BEST MODE FOR CARRYING OUT THE INVENTION

Figure 1:
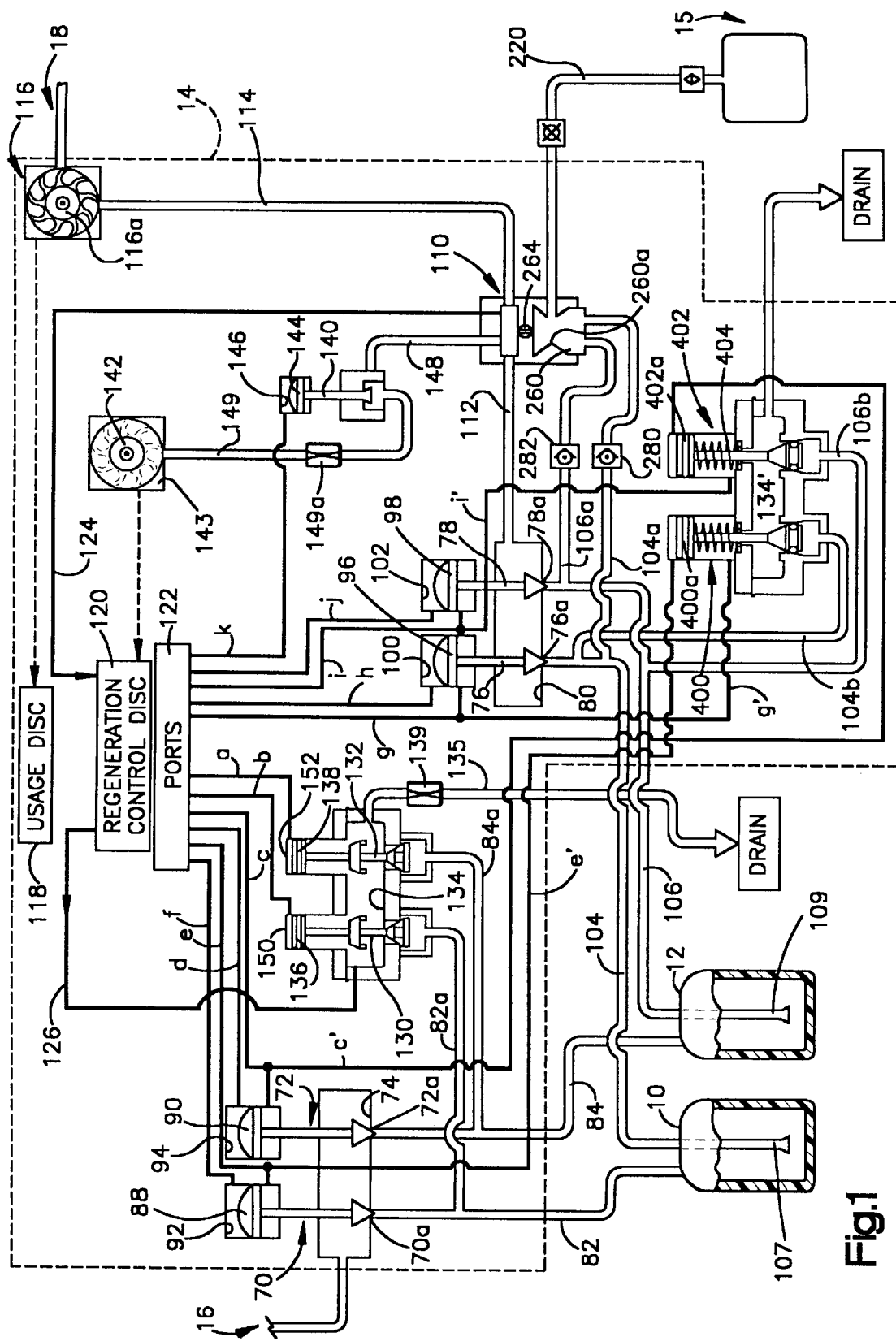
FIG. 1 is a schematic representation of a water treatment system embodying the present invention.

FIG. 1 schematically illustrates a water treatment system constructed in accordance with the preferred embodiment of the invention. The system includes a pair of resin tanks 10, 12 interconnected by a control valve module 14 that is similar to the control valves described in U.S. Pat. Nos. 4,298,025 and 3,891,552 which are hereby incorporated by reference. A source of regeneration solution indicated generally by the reference character 15 is connected to the valve 14.

The control valve assembly 14 controls the communication of a source of water to be treated, indicated generally by the reference character 16 with the treatment tanks 10, 12; the communication of the tanks with an outlet indicated by the reference character 18; and, the regeneration of an exhausted tank.

The valve assembly 14 includes a plurality of water pressure operated valves, the opening and closing of which are controlled by a fluid signal control system. Whether the tanks 10, 12 are on-line or off-line is determined by a pair of inlet valves 70, 72 disposed in an inlet chamber 74 and a pair of outlet valves 76,78 disposed in an outlet chamber 80. The inlet conduit 16 fluidly communicates with the inlet chamber 74. The inlet valves 70, 72 control the communication between the inlet chamber 74 and respective tank inlet passages 82, 84. Opening the valves 70, 72 allows feed water in the inlet conduit 16 to proceed into the tanks 10, 12, respectively.

The valves 70, 72 are operatively connected to a piston 88, 90 disposed in chambers 92, 94, respectively. The application of fluid pressures above the pistons apply valve closing forces to urge the valves 70, 72 into engagement with respective valve seats 70*a*, 72*a*. The application of fluid pressure to the underside of the pistons exerts valve opening forces.

The outlet valves 76, 78 are similarly configured and include pistons 96, 98 disposed in chambers 100, 102. The application of fluid pressure above and below the pistons 96, 98 applies valve closing and opening forces, respectively for moving the valves 76,78 towards and away from associated valve seats 76*a*, 78*a*.

The valves 76, 78 control the communication between tank outlet passages 104, 106 of the tanks 10, 12, respectively with the outlet chamber 80. The outlet passages 104, 106 are connected to the top of the tanks 10, 12 and are in fluid communication with respective risers 107, 109. The risers extend downwardly from the top of the tanks and open near the bottom of the respective tanks. In normal service, water to be treated is introduced at the top of the tank by an associated inlet passage 82, 84. The water travels downwardly through a treatment media located in the tank and is discharged from the tank by way of the associated riser. In short, the treated water leaves from the bottom of the tanks 10, 12 and travels upwardly through the riser tubes 107, 109 and into the respective outlet passages 104, 106.

When either of the valves are open, water flow from the associated tank is allowed to proceed to a water collection chamber 110 by way of a passage 112. The collection chamber 110 communicates with the outlet conduit 18 through a fluid path that includes a passage 114 and an outlet chamber 116 that includes a rotatable turbine 116*a*. As fully described in U.S. Pat. Nos. 3,891,552 and 4,298,025, the turbine is mechanically coupled to a usage monitoring disk 118 (shown in FIG. 2) which rotates as a function of the amount of water discharged through the outlet chamber 116 into the outlet conduit 18.

Figure 2:
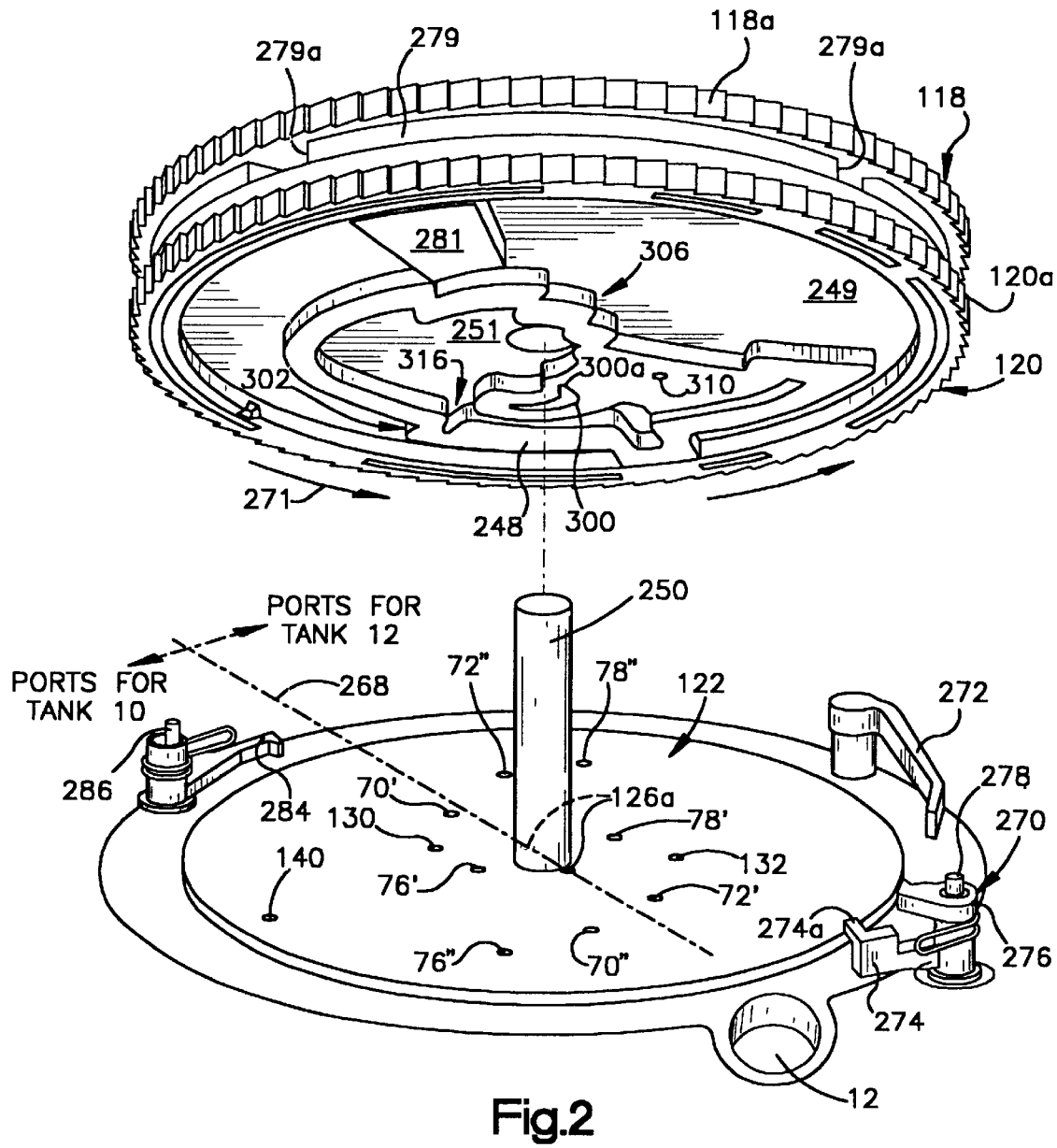
FIG. 2 is a perspective view of a regeneration control disc and associated port insert forming part of the present invention.
Figure 4:
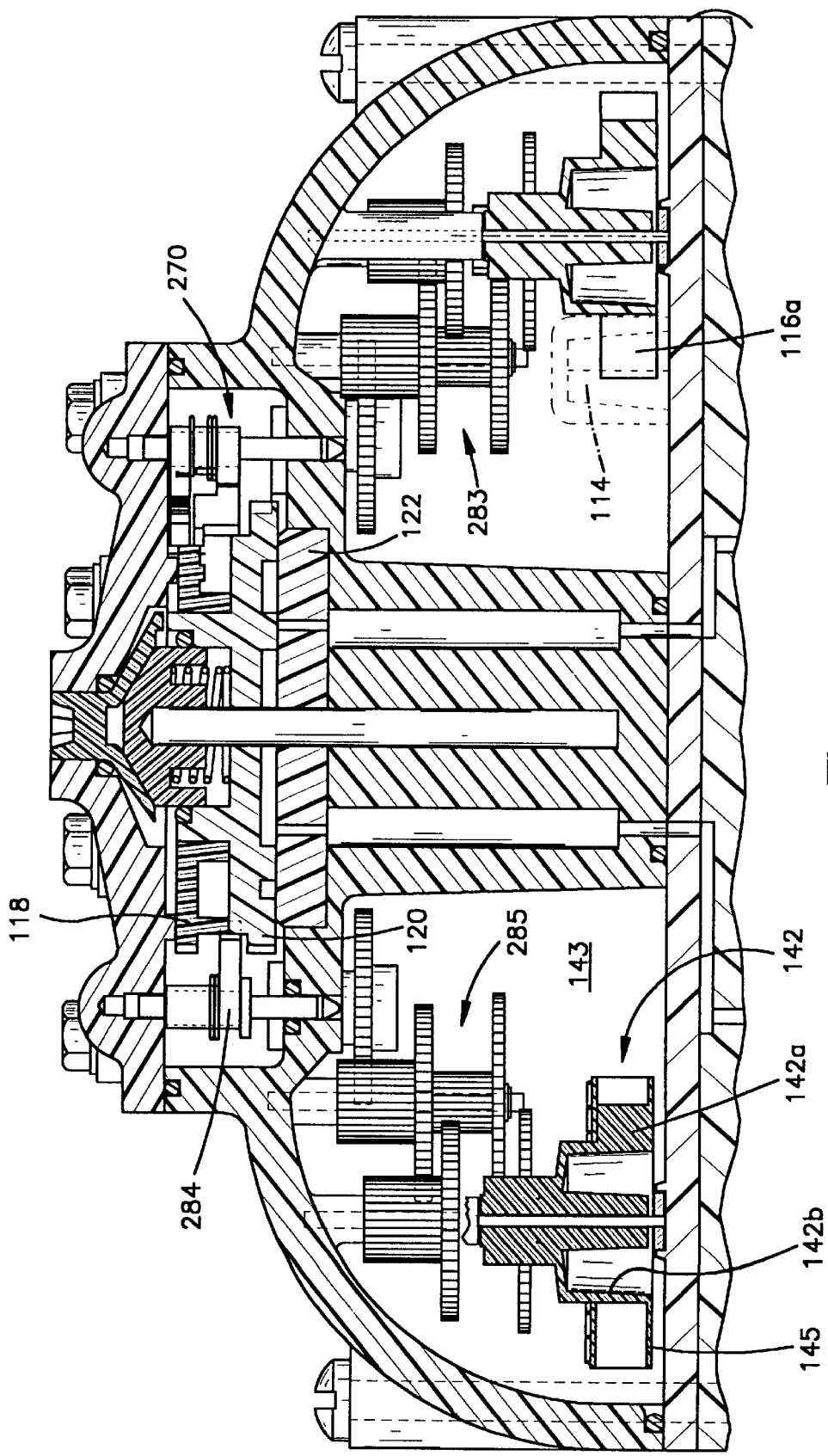
FIG. 4 is another fragmentary, sectional view of the control valve that is shown schematically in FIG. 1.
Figure 5:
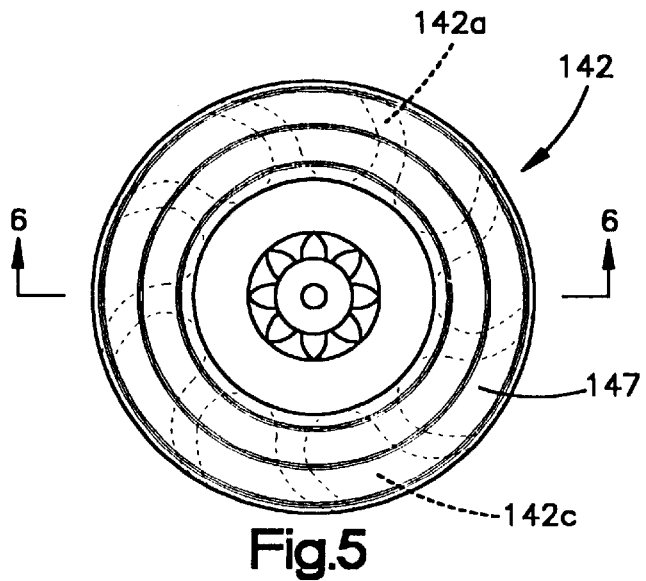
FIG. 5 is an elevational view of a regeneration control turbine constructed in accordance with the preferred embodiment of the invention.

Referring also to FIGS. 2 and 4, the usage monitoring disk 118 cooperates with a regeneration control disk 120. The control disk rotates atop an annular insert 122 that defines a plurality of ports each communicating with an associated signal line. Signal lines a–k are illustrated in FIG. 1. Each line extends from the port insert 122 to one of a plurality of piston chambers. The control disk 120 sealingly engages the top surface of the insert 122 and includes structural formations that operate to communicate the ports formed in the insert 122 with either water supply pressure (supplied by a passage 124) or ambient pressure (by communicating the ports with one of two drain passages 126*a*), shown in FIG. 2. In FIG. 1, the drain passages 126*a* are represented by a single drain line designated as 126. The ports and regeneration control disk 120 are arranged so that as the regeneration wheel 120 rotates, the valves are sequentially operated in order to cycle an exhausted tank through a regeneration cycle.

In addition to the valve elements described above, the control valve assembly 14 also includes a pair of drain valves 130, 132 for controlling the communication of the tank inlet passages 82, 84, respectively, with a drain chamber 134 through respective branch passages 82*a*, 84*a*. The drain chamber 134 communicates with ambient pressure drain through a drain conduit 135.

The drain valves 130, 132 are operated by pistons 136, 138 disposed in respective piston chambers 150, 152. In the preferred embodiment, the pistons are single acting and are driven to a valve open position by the application of fluid pressure to their top surfaces via signal lines a, b. When the fluid signals applied to the top piston surfaces is terminated, the drain valves 130, 132 are returned to their closed positions by a biasing force generated on the underside of the pistons by back pressure developed in the drain chamber 134. The back pressure in the drain chamber 134 is developed due to a flow restrictor 139 disposed in the drain conduit. As the drain valves near their closed positions, fluid pressure in the conduits 82a, 84a apply additional force to the valve heads tending to fully close the valves and maintain their closure. In an alternate embodiment, biasing springs (not shown) bias the valves towards their closed positions illustrated in FIG. 1 when the associated signal lines a, b are depressurized.

Figure 3:
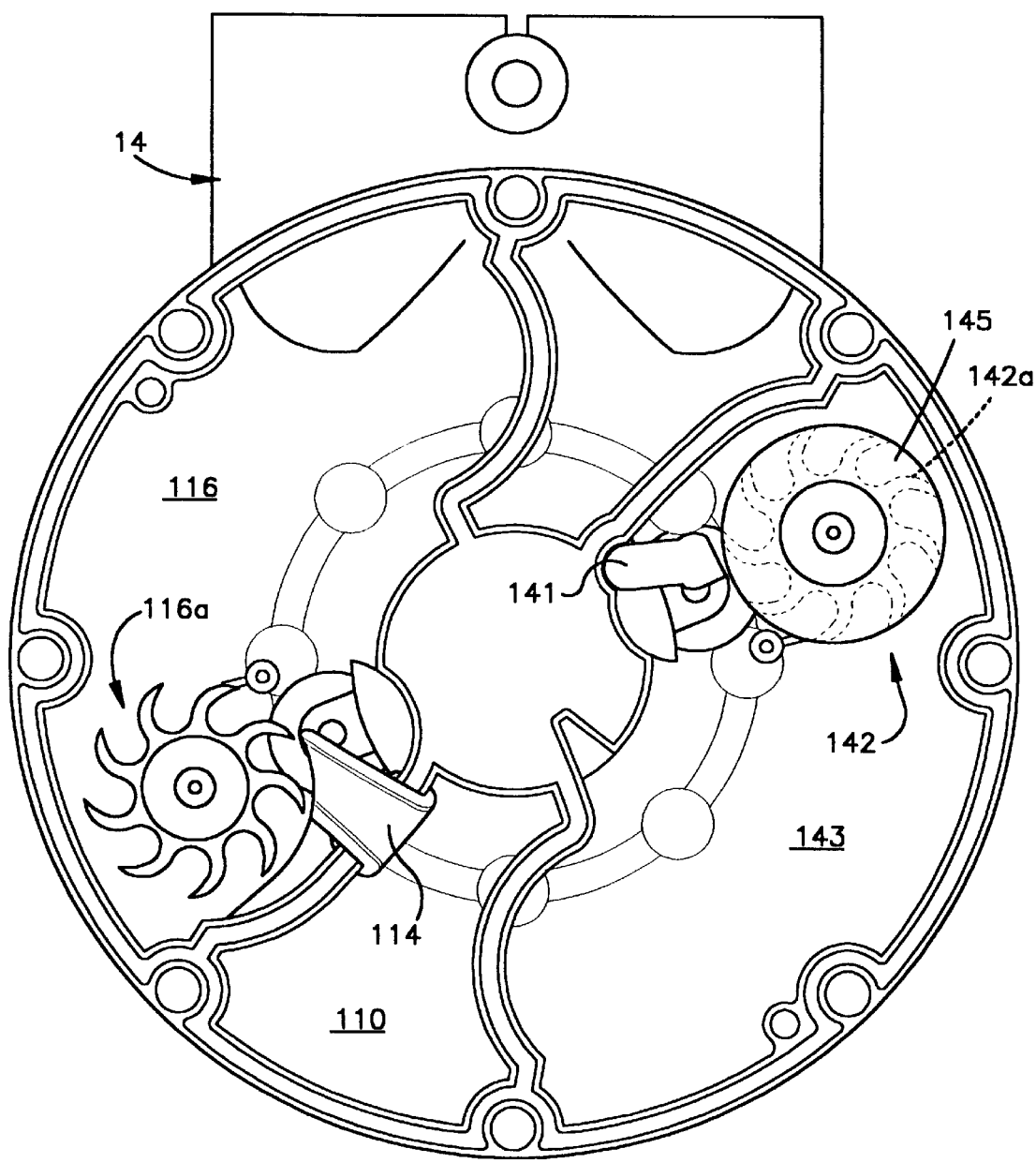
FIG. 3 is a fragmentary, sectional view of a control valve shown schematically in FIG. 1.

A regeneration control valve 140 controls the communication of water pressure from the water collection chamber 110 to a regeneration control turbine 142 located in a turbine chamber 143. The valve 140 includes a single acting piston 144 disposed in a chamber 146. The valve 140 is biased to its closed position by back pressure generated by a flow restrictor 149a disposed in a delivery passage 149 which controls the flow rate of water from the collection chamber 110 communicated through a passage 148, when the valve 140 is opened. When the regeneration control valve 140 is opened (by the application of a fluid signal to the top surface of the piston by way of the signal line k) water pressure is allowed to proceed from the passage 148 to the passage 149 which includes a nozzle 141 (Shown only in FIG. 3) for directing water against the turbine 142. The turbine 142 is mechanically coupled to the regeneration control disk 120 so that rotation of the turbine effects rotation of the control disk.

The application of fluid signals to the various piston chambers, as controlled by the relative movement of the regeneration control wheel with respect to the port insert 122, determines the sequence of valve actuation. The control disk 120 selectively communicates either water pressure from the collection chamber (fed to the disk by the pressure line 124) or the ambient drain pressure via the passage 126 (which communicates with the drain ports 126a shown in FIG. 2), to the various signal lines.

The regeneration components include a regeneration fluid aspirator 260 disposed in the collection chamber 110. The aspirator comprises a fluid flow regulating element 264 and a venturi 260a. The outlet of the venturi communicates with the tank outlet passages 104, 106 through branch passages 104a, 106a that include check valves 280, 282. The throat of the venturi communicates with the source of regeneration solution 15.

When either of the drain valves 130, 132 are opened (and the respective inlet and outlet valves are both closed), water in the collection chamber 110 is allowed to proceed through the venturi 260a and into the tank being regenerated. For example, suppose the drain valve 130 is opened. Water from the collection chamber will flow through the venturi 260a into the outlet passage 104 of the tank 10 (via passage 104a). The water will then travel through the tank assembly 10 in a counterflow direction and be ultimately discharged to the ambient drain by way of the inlet passage 82, the branch passage 82a and the drain chamber 134. As water passes through the venturi, regeneration fluid is drawn from the regeneration source 15 through a supply conduit 220 and mixed or "aspirated" with the venturi fluid. The regeneration fluid (now diluted with treated water) passes through the tank being regenerated. The effluent from the tank is discharged to drain via the drain chamber 134.

The sequence of regeneration steps as well as the frequency of regeneration is controlled by the regeneration control disk 120 and the usage disk 118, respectively.

Referring to FIGS. 1, 2 and 4, the regeneration control disk 120 sealingly engages and rotates atop the circular port-defining insert 122. The ports defined by the insert 122 communicate with the various piston chambers. The underside of the regeneration control disk 120 includes a depending wall 248 that divides the underside of the disk 120 into pressurized and drain regions 249, 251. The port insert 122 includes a pair of drain apertures 126a located on either side of an upwardly extending stub shaft 250 about which both the regeneration control disk 120 and the water usage disk 118 rotate. The drain apertures 126a communicate with the drain chamber 134 through the passage 126 (shown in FIG. 1) which is integrally formed in the valve body. Thus, the drain region of the regeneration control disk is maintained at the ambient drain pressure.

Two sets of ports are provided in the insert 122 and are located symmetrically about an imaginary diametral line 268. The ports to the left of the line 268 control the regeneration sequence for the tank 10 whereas the ports to the right of the line 268 control the regeneration sequence for the tank 12. During a regeneration cycle, the control disk 120 rotates 180° to effect the complete regeneration cycle of one of the tanks. The location of the ports and their function, as shown in FIG. 2 correspond to the ports shown and described in U.S. Pat. Nos. 3,891,552 and 4,298,025. As fully explained in these earlier patents, the depending wall 248 controls the communication of pressurized water from the pressurized region 249 to the ports or communicates the ports with the drain region 251 to depressurize the respective chambers. The inlet and outlet valves 70, 72, 76 and 78 each include a "top" and a "bottom" port. The "top" ports communicate with the top of the associated operating pistons 88, 90, 96, 98 and the pressurization of these ports apply a valve closing force. Conversely, the "bottom" ports communicate with the underside of the pistons and apply valve opening forces when pressurized.

To facilitate the explanation, the ports shown in FIG. 2 will use the same reference characters as those used for the valves with which they communicate. If a given valve has both an upper and lower port, the upper port will be designated by the same reference character that is used for the valve it controls, followed by a single apostrophe. The bottom port for that valve will be designated by the same reference character followed by a double apostrophe. For valves that only require a single port, i.e., the drain valves 130, 132, the port will be designated by the same reference character that is used for the valve. As an example, the port marked 70' communicates with the region above the piston 88 of the intake valve 70 via signal line f. The port marked 70" communicates with the underside of the piston 88 of the valve 70 via signal line e. The port marked 130 communicates with the drain valve 130 via the signal line b.

Usage disk 118 and the regeneration control disk 120 are preferably rotated by a drive mechanism fully disclosed in U.S. Pat. No. 4,298,025. Referring to both FIGS. 1 and 2, the disks 118, 120 are driven by a ratcheting mechanism that includes a plurality of pawls. As seen best in FIG. 2, the usage disk 118 rotates atop and concentrically with the regeneration control disk 120. The disks 118, 120 each include peripheral ratchet teeth 118a, 120a respectively. The water usage disk 118 is rotated by a pawl arrangement indicated generally by the reference character 270. Both discs rotate in the direction indicated by the arrow 271; an anti-reverse pawl 272 prevents reverse rotation of the disk 118.

The pawl arrangement 270 includes a pair of individual, spring biased pawls 274, 276, concentrically journalled on an eccentric shaft 278. The shaft 278 is coupled to the water usage turbine 118a through a reduction gear train 283 (shown in FIG. 4). In operation, the usage turbine 116a shown in FIG. 1, and hence the water usage disk 118 rotates in proportion to the amount of treated water discharged by the valve assembly 14.

The usage disk 118 also includes an axially depending flange 279 that is interrupted by a plurality of circumferentially spaced slots 279a.

The number and position of the slots 279a determine the frequency of regeneration. The lower pawl 274 of the ratchet mechanism 270 includes a prong 274a that extends into sliding engagement with the flange 279. The prong 274a is sized so that when in engagement with the flange, the pawl 274 is maintained out of engagement with the regeneration control disk 120. When the prong 274a enters one of the slots 279a, the pawl 274 engages the ratchet teeth 120a of the regeneration control disk 120 so that rotation of the eccentric shaft 278 causes concurrent rotation in the disks 118, 120. The initial rotation of the regeneration control disk 120 by the lower pawl 274 causes one of the control valve ports in the port insert 122 to be pressurized by virtue of being uncovered by a depending surface 281, thus initiating regeneration.

When the control valve 140 (shown in FIG. 1) is open, a fluid stream is directed to the regeneration turbine 142 (shown in FIG. 1) located in the turbine chamber 143. The turbine 142 is mechanically coupled to a regeneration drive pawl 284 through a reduction gear train 285 (shown in FIG. 4). The pawl is journalled on an eccentric shaft 286. Rotation of the turbine 142 thus effects incremental rotation of the regeneration control disk 120 and in so doing, effects a regeneration cycle. The regeneration cycle continues until the control port communicating with the control valve chamber 146 via signal line K (shown in FIG. 1) is depressurized thus closing the control valve 140.

During the regeneration cycle, treated water is communicated to the venturi 260a. The flow of water through the venturi draws regeneration solution from the regeneration source 15 via conduit 220.

In a water softening application, the regeneration source 15 typically includes a brine well and brine control valve (not shown). When a predetermined amount of regeneration solution is drawn from the source 15, the brine valve (not shown) closes. The flow of treated water (in this example softened water continues to flow into the regenerated tank for a predetermined amount of time to effect a counterflow rinse. After a predetermined amount of time, the flow of softened water into the tank being regenerated is terminated by depressurizing the appropriate drain piston chamber 150, 152.

Figure 6:
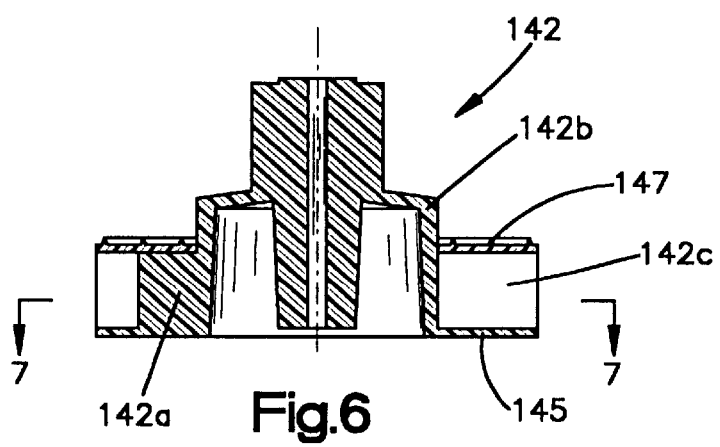
FIG. 6 is a sectional view of the turbine as seen from the plane indicated by the lines 6—6 in FIG. 5.
Figure 7:
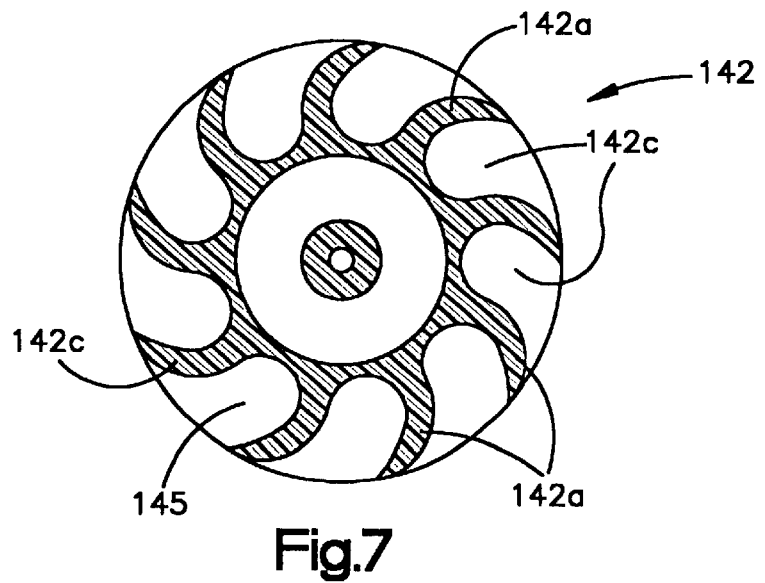
FIG. 7 is another sectional view of the turbine as seen from the plane indicated by the line 7—7 in FIG. 6; and, FIG. 8 is another fragmentary, sectional view of the control valve shown schematically in FIG. 1.

In the illustrated embodiment, the turbine 142 is configured to provide higher operating efficiency as compared to prior constructions. Referring to FIGS. 3–7, the turbine 142 includes a plurality of confined turbine blades 142a. Each blade 142a extends radially from a center hub 142b integrally molded therewith. The blades 142a are located between a pair of disk-like structures 145, 147 which have a periphery coincident with the tips of the blades 142a. In the illustrated embodiment, the lower disk-like structure shown in FIGS. 6 and 7, is an integrally molded part of the turbine 142. The upper structure 147 comprises a disk which is suitably secured to the hub 142b and the blades 142a. With the illustrated construction, a plurality of closed cavities 142c are defined between adjacent blades 142a which capture water emitted by the nozzle 141 (shown in FIG. 3).

Water entering a cavity 142c can only leave through the same opening it entered and as a result, rotation of the turbine 142 can be achieved with less flow as compared to prior art constructions. Additionally, the portions of the turbine not under the influence of the nozzle 141 have less drag as rotate through the fluid bath since fluid is not drawn in near the center and flung outward by cavities 142c which would result in energy loss. With the disclosed turbine configuration, the overall flow rate of fluid from the outlet chamber 110 into the conduit 149 can be substantially reduced thus reducing water consumption for the unit.

Referring in particular to FIGS. 1–4, the process steps will now be discussed in greater detail. As indicated above, a regeneration cycle is initiated when the depending surface 281 uncovers one of the ports communicating with the control valve 140. As seen in FIG. 2, two control valve ports, separated by 180°, are defined in the insert 122. It should be apparent, the regeneration control disk 120 rotates through an arc of 180° during a regeneration cycle. For purposes of explanation, suppose that tank 10 requires regeneration. As indicated in FIG. 2, the ports, defined in the insert 122, to the left of the diametral line 268, control the regeneration of tank 10. Movement of the regeneration control disk 120 is initiated by the pawl assembly 270 as explained above. The initial movement in the disk 120 by the pawl 270 causes the depending syrface 281 to uncover the control valve 140.

The water treatment unit then goes through several process steps to complete the regeneration cycle. Initially the regeneration solution is passed through the tank being regenerated in a counter-flow direction. This is followed by a slow rinse which is also in the counter-flow direction. More specifically, in the slow rinse step, treated water (i.e. softened water if the unit is a water softener) from the collection chamber 110 is injected into the outlet of the tank being regenerated, travels down the associated riser tube 107 or 109 and then is discharged through the inlet conduit into the drain chamber. Full details of this step of the regeneration process can be found in U.S. Pat. Nos. 4,298,025 and 3,819,552.

The present invention however, adds a full downflow rinse step following the counter-flow rinse step. The down flow rinse step conveys water through the regenerated tank in a service direction. This step flushes any remaining regeneratant out of the tank while at the same time tending to pack the bed in preparation for placing the tank in service.

To achieve this step, a pair of purge valves 400, 402 are provided in the control valve 14. The purge valves control the fluid communication between the outlets of the tanks 10, 12 and an ambient drain. More specifically, to effect a downflow rinse of a tank, its associated intake valve is opened, its outlet valve is closed and its associated purge valve is opened. With this valve relationship, source water is communicated to the inlet chamber 74, proceeds into the tank, passes through the water treatment media, and is ultimately discharged from the tankthrough the associated riser tube. The discharged water is conveyed to drain through an open purge valve associated with the tank.

The logic and hydraulics for opening and closing the purge valves 400, 402 are obtained from fluid signals being sent to the inlet and outlet valves. For purposes of an explanation suppose that tank 12 is the one being regenerated. At the conclusion of the regeneration solution injection- step, the tank 12 is rinsed in the counter-flow direction by opening its associated outlet valve 78, opening drain valve 132 while maintaining its associated inlet valve 72 closed. The intake valve is maintained in closed position by the fluid signal communicated to the piston chamber via signal line d. The drain valve is opened by a signal pressure communicated to the drain piston chamber 122 via the signal line a. The associated outlet valve 78 is opened by a signal pressure communicated to the outlet valve chamber by the signal line i.

After a predetermined interval of time, (determined by the rotation rate of the regeneration control disk 120) the downflow rinse step is initiated. To initiate this step, the associated outlet valve 78 is driven to the closed position by a signal pressure communicated to the piston chamber 102 by the signal line j. Concurrently with the application signal pressure via signal line j, the underside of the outlet piston 78 is vented to atmosphere via signal line i. The associated inlet valve 72 is opened by venting the region above the piston 90 to drain via signal line d while concurrently pressurizing the under side of the piston 90 via signal line c. These fluid signals applied to the associated inlet and outlet valves 72, 78 are used to open the associated purge valve 402. In particular, a branch signal line i' communicates with the under side of the purge valve piston 402a thus venting the underside to atmosphere (since the underside of the outlet piston 78 is also at atmosphere). Concurrently, signal pressure applied to the underside of the inlet valve piston 90 is communicated to the top of the purge valve piston 402a by branch signal line c'. Thus, when the control valve 14 is placed in a state such that the inlet valve i.e. 72 of a tank being regenerated i.e. tank 12 is driven to an opened position while its associated outlet valve i.e. 78 is driven to a closed position, its associated purge valve i.e. 402 is opened.

Figure 8:
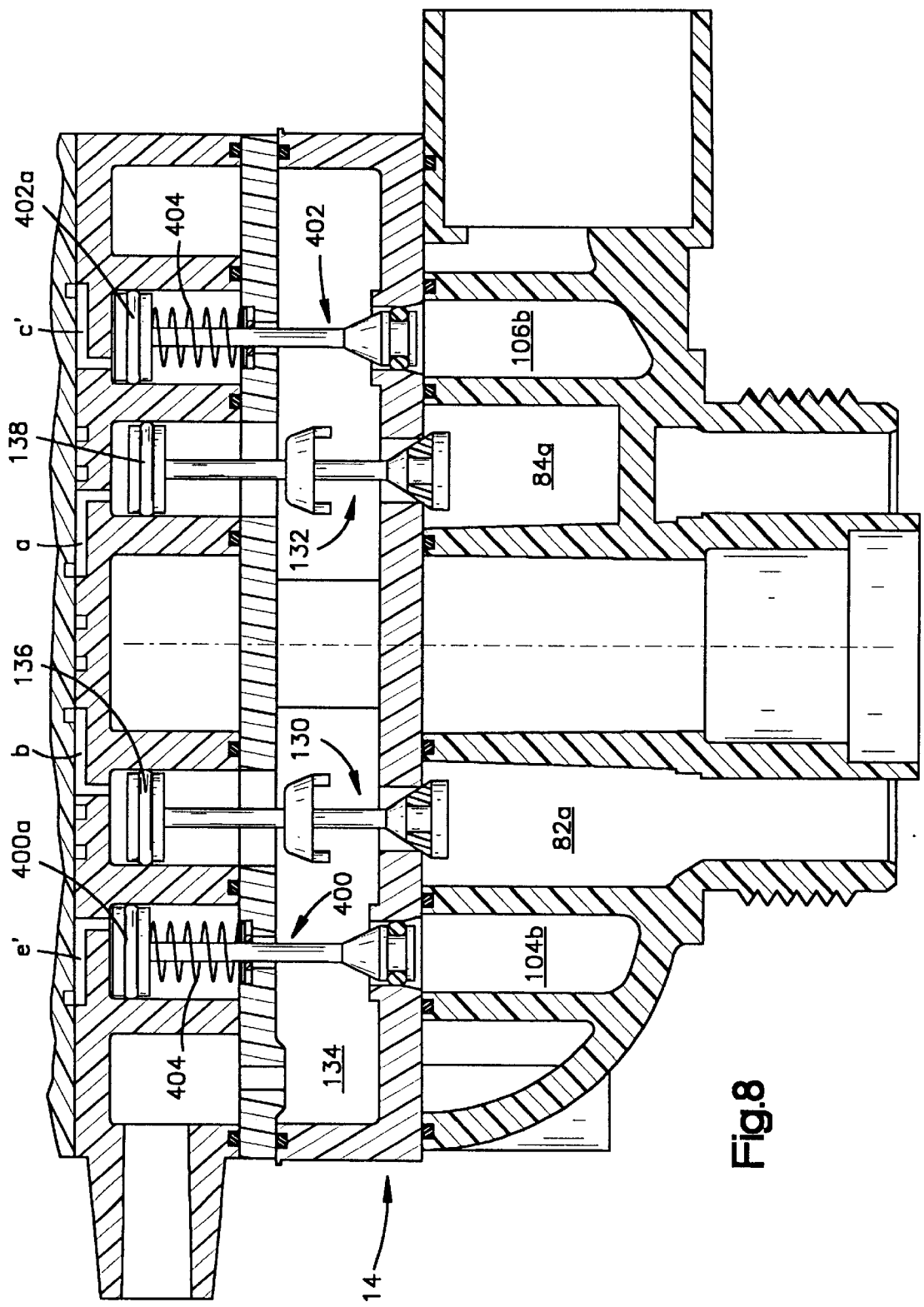

Referring to FIGS. 1 and 8, with the purge valve 402 of the tank 12 open, source water from the inlet chamber 74 travels into the inlet of tank 12 via conduit 84. This rinse water travels through the treatment media in the tank and is ultimately discharged through the riser 109. The discharged water travels through conduit 106 and travels into the purge valve drain chamber 134' by way of branch conduit 106b. The water is then discharged to an ambient drain that communicates with the chamber 134'.

At the conclusion of the downflow rinse step, the signal pressure above the purge valve piston i.e. 402a is vented to atmosphere via purge signal line c' and as a result biasing spring 404 returns the purge valve 402 to the closed position illustrated in FIG. 1.

The downflow fast rinse step for tank 10 is achieved in a similar manner. In the case of tank 10, its associated purge valve 400 is opened and closed by signal pressures communicated from the underside of the associated inlet valve 70 via branch signal e' and the signal pressure communicated to the underside of the purge piston 400a via branch signal line g'. During the downflow rinse step of tank 10, source water in the inlet chamber 74 is communicated to the tank 10 via the opened inlet valve 70 and the conduit 82. The rinse water travels downwardly through the treatment media and is discharged from the tank via the riser tube 107 and outlet conduit 104. This rinse water is ultimately discharged to an ambient drain via branch outlet passage 104b, the open purge valve 400 and the drain chamber 134'. At the conclusion of the rinse step, a biasing spring 404 recloses the purge valve once the region above the purge valve piston 400a is depressurized.

In the preferred embodiment, the drain chamber 134', which is shown separately in FIG. 1, actually forms part of the drain chamber 134. This preferred configuration is shown in FIG. 8.

Although the invention has been described with a certain degree of particularity, it should be understood that those skilled in the art can make various changes to it without departing from the spirit or scope as hereinafter claimed.

We claim:

1. A water treatment apparatus, comprising:
   a) a pair of water treatment tanks each defining a fluid flow path including a compartment containing water treatment media through which water to be treated is passed;
   b) control means for controlling which of said tanks is on-line and which of said tanks is off-line;
   c) an inlet valve associated with each tank, said inlet valve movable between open and closed positions by a fluid pressure operated inlet valve operating member responsive to at least a first pressrized fluid signal applied to said operating member by said control means
   d) an outlet valve associated with each tank, said outlet valve movable between open and closed positions by a fluid pressure operated outlet valve operating member responsive to at least a second pressurized fluid outlet signal applied to said operating member by said control means;
   e) monitoring means for determining when an on-line tank requires regeneration; and,
   f) regeneration control system including valving for communicating regeneration solution to said off-line tank and including means for fast rinsing said off-line tank in a service direction, said fast rinsing means including a fluid pressure operated purge valve that is responsive to at least one of said first and second pressurized fluid signals applied to said inlet and outlet valve operating members associated with each water treatment tank.

2. The treatment system of claim 1, further including a turbine forming part of said regeneration control system, said turbine including a plurality of vanes disposed between two disc-like members, said disc-like members and vanes defining enclosed, peripheral cavities and which are operative to receive water emitted by a regeneration control nozzle whereby rotation in said turbine is effected.

3. A water treatment apparatus comprising:
   a. at least one water treatment tank defining a fluid flow path extending from a tank inlet to a tank outlet, said treatment tank including water treatment media disposed in said flow path;
   b. a means comprising
      i. a system controller for controlling the regeneration of said treatment media,
      ii. a fluid pressure operated inlet valve associated with said tank inlet, said inlet valve responsive to a first pressurized fluid signal and operative to control the communication of water to be treated with said tank inlet, and
      iii. a fluid pressure operated outlet valve associated with said tank outlet, said outlet valve responsive to a second pressurized fluid signal and operative to control the communication of treated water from said tank outlet with a system outlet;
   c. regeneration determining apparatus for determining when said treatment media requires regeneration; and
   d. a rinse controller for controlling the rinsing of said treatment media in a service direction;
   e. said rinse controller including a purge valve communicating said outlet of said tank with an ambient drain, said purge valve responsive to at least one of said first and second pressurized fluid signals.

4. The apparatus of claim 3, further including a second treatment tank, said system controller including means for maintaining one of said tanks on-line, while said other tank is regenerated and then maintained off-line until said one tank requires regeneration.

5. The apparatus of claim 3, further including a regeneration control turbine including a plurality of vanes extending from a hub and including elements for enclosing side edges of said vanes in order to define enclosed cavities for receiving water emitted by a regeneration control nozzle.

6. The apparatus of claim 3, wherein one of said first and second pressurized fluid signals applies a valve closing force to said tank outlet valve and another of said first and second pressurized fluid signals applies a valve closing force to said tank inlet valve.

7. A water treatment apparatus comprising:
   a. at least one water treatment tank defining a fluid flow path extending from a tank inlet to a tank outlet, said treatment tank including water treatment media disposed in said flow path;
   b. a means comprising
      i. a system controller for controlling the regeneration of said treatment media,
      ii. a fluid pressure operated inlet valve associated with said tank inlet, said inlet valve moveable between open and closed positions and operative to control the communication of water to be treated with said tank inlet, and
      iii. a fluid pressure operated outlet valve associated with said tank outlet, said outlet valve moveable between open and closed positions and operative to control the communication of treated water from said tank outlet with a system outlet;
   c. regeneration determining apparatus for determining when said treatment media requires regeneration; and
   d. a rinse controller for controlling the rinsing of said treatment media in a service direction;
   e. said rinse controller including a purge valve communicating said outlet of said tank with an ambient drain, said purge valve responsive to predetermined positions of said inlet and outlet valves.

* * * * *